(12) United States Patent
Saegusa et al.

(10) Patent No.: US 8,600,279 B2
(45) Date of Patent: Dec. 3, 2013

(54) RESIN MATERIAL, ENDLESS BELT, ROLL, IMAGE FIXING UNIT, AND IMAGE FORMING APPARATUS

(75) Inventors: Hiroshi Saegusa, Kanagawa (JP); Hisae Yoshizawa, Kanagawa (JP); Kaoru Torikoshi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 358 days.

(21) Appl. No.: 13/190,190

(22) Filed: Jul. 25, 2011

(65) Prior Publication Data
US 2012/0195656 A1    Aug. 2, 2012

(30) Foreign Application Priority Data

Feb. 2, 2011    (JP) ................. 2011-021174

(51) Int. Cl.
*G03G 15/20*    (2006.01)
*C08G 18/00*    (2006.01)
(52) U.S. Cl.
USPC .......................................... 399/333; 525/123

(58) Field of Classification Search
USPC ......... 399/302, 303, 308, 312, 313, 328–331, 399/333; 525/123
See application file for complete search history.

(56) References Cited

U.S. PATENT DOCUMENTS

| 6,935,994 | B2 | 8/2005 | Nakano |
| 7,807,753 | B2 | 10/2010 | Ishihara et al. |
| 8,417,163 | B2 * | 4/2013 | Yoshizawa et al. ........... 399/333 |
| 8,436,124 | B2 * | 5/2013 | Yoshizawa et al. ........... 525/123 |
| 2002/0012550 | A1 | 1/2002 | Nakano |
| 2006/0292379 | A1 | 12/2006 | Ishihara et al. |

FOREIGN PATENT DOCUMENTS

| JP | A-02-279710 | 11/1990 |
| JP | A-10-142990 | 5/1998 |
| JP | A-11-231684 | 8/1999 |
| JP | A-2001-183935 | 7/2001 |
| JP | A-2007-031690 | 2/2007 |

* cited by examiner

*Primary Examiner* — William J Royer
(74) *Attorney, Agent, or Firm* — Oliff & Berridge, PLC

(57) ABSTRACT

Provided is a resin material including at least one of a reaction product and a mixture of a polyimide and a polyurethane that is a polymer of an isocyanate with an acrylic resin containing a side chain having a hydroxyl group.

15 Claims, 5 Drawing Sheets

RESIN MATERIAL, ENDLESS BELT, ROLL, IMAGE FIXING UNIT, AND IMAGE FORMING APPARATUS

CROSS-REFERENCE TO RELATED APPLICATIONS

This application is based on and claims priority under 35 USC 119 from Japanese Patent Application No. 2011-021174 filed Feb. 2, 2011.

BACKGROUND

Technical Field

The present invention relates to a resin material, an endless belt, a roll, an image fixing unit, and an image forming apparatus.

SUMMARY

According to an aspect of the invention, there is provided a resin material including a reaction product by reacting an isocyanate with an acrylic resin containing a side chain having a hydroxyl group in the presence of a polyamide.

BRIEF DESCRIPTION OF THE DRAWINGS

Exemplary embodiments of the present invention will be described in detail based on the following figures, wherein.

DETAILED DESCRIPTION

[Resin Material]

Figure 1:
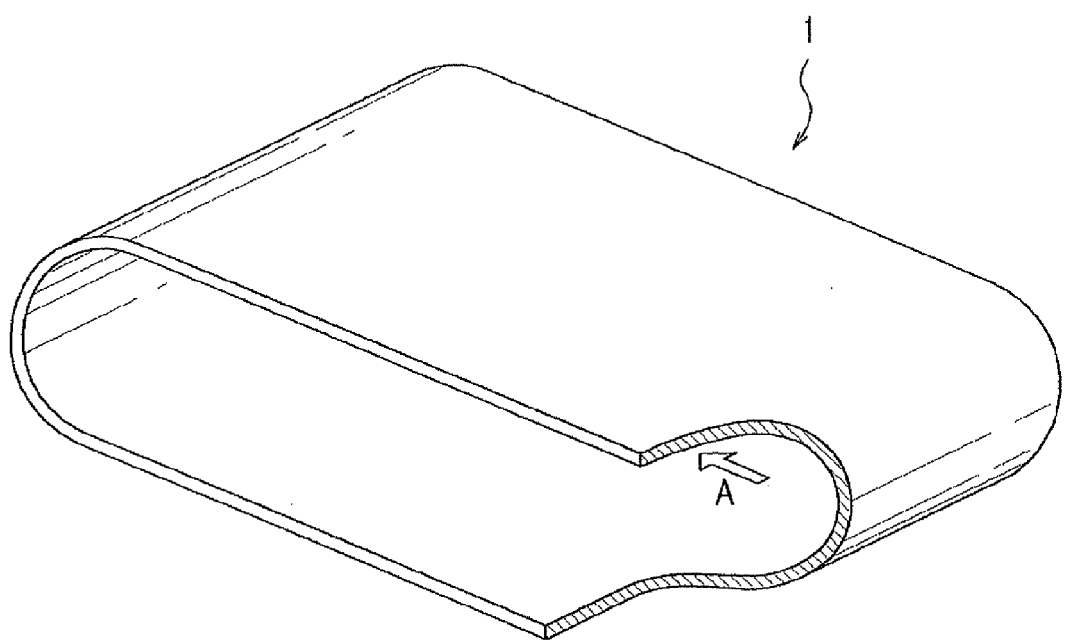
FIG. 1 is a perspective view showing a schematic configuration of an endless belt according to the present exemplary embodiment.

The resin material according to the present exemplary embodiment is characterized by including a reaction product by reacting an isocyanate with an acrylic resin containing a side chain having a hydroxyl group in the presence of a polyamide (hereinafter, may be referred to as "polyurethane-polyimide material").

Since the resin material of the present exemplary embodiment has the configuration described above, the surface damage-restoring property is less susceptible to changes by heat, as compared to the case which does not contain the polyurethane-polyimide material and contains the polyurethane as it is. Although the reason is not clear, it is surmised to be as follows.

The resin material containing a polyurethane that is a polymer of an isocyanate with an acrylic resin containing a side chain having a hydroxyl group is excellent in terms of a recovering property (self-restorability) for surface damage of a resin material, in a specific temperature range.

However, with regard to the resin material, particularly where the polyurethane is contained as it is, when the resin material is exposed to temperatures higher than the aforementioned temperature range in which self-restorability is excellent, the self-restorability in the aforementioned temperature range may be deteriorated. Specifically, for example, when the resin material is exposed to temperatures higher than the aforementioned temperature range, it is considered that the temperature range at which the self-restorability is excellent may be narrowed due to deterioration of self-restorability over the aforementioned temperature range, particularly at the high-temperature side.

On the other hand, the resin material of the present exemplary embodiment includes the aforementioned polyurethane-polyimide material. Therefore, it is believed that even when the resin material is exposed to temperatures higher than the aforementioned temperature range, since the structure of the polyurethane component is not readily changed due to the presence of the polyimide component with excellent heat resistance around the polyurethane component, the self-restorability of the resin material is not readily changed.

In the present exemplary embodiment, the acrylic resin may be in a form containing a side chain having a fluorine atom. The polyurethane-polyimide material which has the acrylic resin containing a side chain having a fluorine atom, makes the releasability of the surface not susceptible to changes by heat, as compared to the case containing the polyurethane as it is. Although the reason is not clear, it is surmised to be as follows.

The resin material containing a polyurethane that is a polymer of an isocyanate with an acrylic resin containing a side chain having a hydroxyl group and a side chain having a fluorine atom is also excellent in releasability of the resin material surface, in addition to being excellent in self-restorability.

However, with regard to the resin material, particularly where the polyurethane is contained as it is, when the resin material is exposed to temperatures higher than the aforementioned temperature range in which self-restorability is excellent, the releasability thereof may be deteriorated. Specifically, for example, when the resin material is exposed to temperatures higher than the aforementioned temperature range, it is considered that the contact angle on the resin material surface may be decreased.

On the other hand, it is believed that since the resin material of the present exemplary embodiment contains the polyurethane-polyimide material as described above, the structure of the polyurethane component is not readily susceptible to changes and the releasability of the resin material surface is not readily susceptible to changes even when the resin material is exposed to temperatures higher than the aforementioned temperature range.

For example, the resin material of the present exemplary embodiment may be a resin material in which the polyimide is a solvent-soluble polyimide, and the polyurethane-polyimide material is obtained by polymerization of the acrylic resin and the isocyanate in the presence of the polyimide. By using the polyurethane-polyimide material obtained by the aforementioned method, a surface damage-restoring property is not readily susceptible to changes by heat, as compared to the use of a polymerization product of an acrylic resin and an isocyanate in the absence of polyimide (for example, a later mixture of polyurethane and polyimide, which are separately polymerized).

Although the reason is not clear, it may be considered that since the polyurethane-polyimide material is obtained by the aforementioned method, the presence of the polyimide component with excellent heat resistance around a polyurethane component becomes easy, for example, such as penetration of a polyimide component into the crosslinking part of polyurethane. For this reason, it is believed that the structure of the polyurethane component is not readily susceptible to changes by heat and consequently self-restorability of the resin material is also not readily susceptible to changes by heat.

Hereinafter, components constituting the polyurethane-polyimide material will be described.

<Polyurethane>

The polyurethane is a polymer of an isocyanate with an acrylic resin containing a side chain having a hydroxyl group (hereinafter, may be referred to as "side chain hydroxyl group"), as described above, and may also contain constituent units derived from other additives, in addition to a constituent unit derived from the acrylic resin and a constituent unit derived from the isocyanate.

Acrylic Resin

The acrylic resin is a resin having at least a side chain hydroxyl group. Preparation of the acrylic resin uses at least one of a monomer having at least a hydroxyl group and a monomer having a carboxyl group, if desired, in combination with a monomer having no hydroxyl group.

Examples of the monomer having a hydroxyl group include ethylenic monomers having a hydroxyl group, such as hydroxymethyl(meth)acrylate, hydroxyethyl(meth)acrylate, hydroxypropyl(meth)acrylate, hydroxybutyl(meth)acrylate and N-methylol acrylamine.

Examples of the monomer having a carboxyl group include ethylenic monomers having a carboxyl group, such as (meth)acrylic acid, crotonic acid, itaconic acid, fumaric acid and maleic acid.

Examples of the monomer having no hydroxyl group include ethylenic monomers including (meth)acrylic acid alkyl esters such as methyl(meth)acrylate, ethyl(meth)acrylate, propyl(meth)acrylate, butyl(meth)acrylate, n-propyl(meth)acrylate, n-butyl(meth)acrylate, isobutyl(meth)acrylate, 2-ethylhexyl(meth)acrylate, n-octyl(meth)acrylate and n-dodecyl(meth)acrylate.

Further, the acrylic resin may be a resin containing a hydroxyl group of a side chain having 10 or more carbon atoms (hereinafter, may be referred to as "long side chain hydroxyl group"). Examples of the monomer used for the preparation of an acrylic resin containing a long side chain hydroxyl group include adducts in which 3 to 5 moles of ε-caprolactone are added to 1 mole of hydroxymethyl(meth)acrylate.

The acrylic resin, as described above, may be an acrylic resin which, in addition to a side chain hydroxyl group, further contains a side chain having a fluorine atom (hereinafter, may be referred to as "fluorinated acrylic resin"). Preparation of the fluorinated acrylic resin uses at least one of a monomer having a hydroxyl group and a monomer having a carboxyl group, and a monomer having a fluorine atom, if desired, in combination with a monomer having no hydroxyl group and fluorine atom.

The monomer having a fluorine atom is not particularly limited as long as it contains a fluorine atom. Examples of the constituent unit derived from a monomer having a fluorine atom include one in which the number of carbon atoms of the side chain is in a range of from 1 to 20, and the number of carbon atoms of the side chain may be in a range of from 2 to 10. Further, the carbon chain in the side chain of the constituent unit derived from a monomer having a fluorine atom may be linear or branched.

Although the number of fluorine atoms contained in one molecule of the monomer having a fluorine atom is not particularly limited, for example, it may be in a range of from 1 to 40, preferably from 3 to 30, and more preferably from 5 to 20.

Specific examples of the monomer having a fluorine atom include 2-(perfluorobutyl)ethyl acrylate, 2-(perfluorohexyl)ethyl acrylate, hexafluoro-2-propyl acrylate, heptafluoro-2-propylacrylate, 1H,1H,5H-octafluoropentylacrylate, 1H,1H, 7H- dodecafluoroheptylacrylate, 2-(perfluorobutyl) ethylmethacrylate, 2-(perfluorohexyl) ethylmethacrylate, hexafluoro-2- propylacrylate and perfluorohexyl ethylene.

Among the constituent units constituting the fluorinated acrylic resin, the content of the constituent unit derived from a monomer having a fluorine atom may be in a range of from 0.1 to 0.7 (molar ratio), and preferably from 0.2 to 0.5 (molar ratio).

As a synthetic method of the acrylic resin, for example, there is a method of mixing the aforementioned monomers, followed by radical polymerization or ionic polymerization or the like, and purifying the resulting product.

Acrylic resins may be used alone or in a combination of two or more thereof.

Isocyanate

The isocyanate functions as a crosslinking agent which crosslinks between the acrylic resins, or otherwise when additives to be described hereinafter are used, between the acrylic resins and the additives or between the additives.

The isocyanate is not particularly limited and examples thereof include methylene diisocyanate, toluene diisocyanate, hexamethylene diisocyanate, and isophorone diisocyanate. Further, isocyanates may be used alone or in a combination of two or more thereof.

Further, with regard to the addition amount of the isocyanate, the number of moles (C) of isocyanate group to be added may be in a range of from 0.5 time to 3 times as much as the total number of moles of hydroxyl groups of the acrylic resin and moles of hydroxyl groups of the additive to be described hereinafter.

Additive

Examples of the additive include polyols having plural hydroxyl groups. Polyols are not particularly limited and examples thereof include a polyol which has plural hydroxyl groups and in which all the hydroxyl groups are connected via a chain having 6 or more carbon atoms (number of carbon atoms in the portion of a linear chain connecting between hydroxyl groups) (hereinafter, may be referred to as "long chain polyol"), and a polyol having a fluorine atom (hereinafter, may be referred to as "fluorinated polyol").

Specific examples of the long chain polyol include bifunctional polycaprolactone diols such as a compound represented by the following formula (1), trifunctional polycaprolactone triols such as a compound represented by the following formula (2), and other tetrafunctional polycaprolactone polyols. Long chain polyols may be used alone or in a combination of two or more thereof.

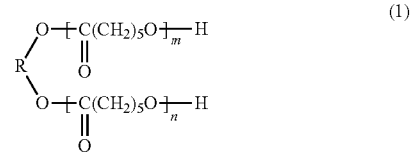

In formula (1), R represents $C_2H_4$, $C_2H_4OC_2H_4$ or $C(CH_3)_2(CH_2)_2$, and m and n represent an integer of from 4 to 35.

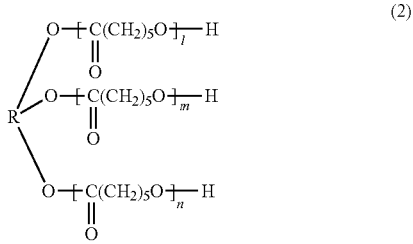
(2)

In formula (2), R represents $CH_2CHCH_2$, $CH_3C(CH_2)_2$ or $CH_3CH_2C(CH_2)_3$, and l+m+n represents an integer of from 3 to 30.

The long chain polyol may have a functionality of from 2 to 5 and preferably a functionality of from 2 to 3.

Examples of the fluorinated polyol include polyols having from 1 to 20 carbon atoms, and the carbon chain of the fluorinated polyol may be linear or branched.

The fluorinated polyol may be, for example, a compound represented by the following formula:

Formula: $HO-CH_2-(CF_2)_a-CH_2-OH$

In the formula, a represents an integer of from 1 to 20.

Specific examples of the fluorinated polyol include 1H,1H, 9H,9H-perfluoro-1,9-nonanediol, fluorinated tetraethylene glycol and 1H,1H,8H,8H-perfluoro-1,8-octanediol The additives may be used alone or in a combination of two or more thereof.

The addition amount of the additive may be, for example, an amount such that a ratio (B/A) of total moles (A) of hydroxyl groups contained in all of the acrylic resins used in polymerization and total moles (B) of hydroxyl groups contained in all of additives used in polymerization is in a range of from 0.1 to 10, and preferably from 1 to 4.

<Polyimide>

The polyimide is not particularly limited as long as it has an imide bond, and examples thereof include one which uses, as a precursor, a polyamic acid obtained by polymerization of a tetracarboxylic dianhydride and a diamine or triamine compound in a solvent, and is obtained by imidation of the polyamic acid.

The polyimide may be, for example, a solvent-soluble polyimide as described above. Examples of the solvent-soluble polyimide include materials which are rendered to be dissolved in a solvent even upon performing polyimidation, by lowering the structure symmetry of a polymer molecule through the introduction of a bent structure (such as an ether bond, a thioether bond, a carbonyl bond, a bisphenol A structure or a fluorene structure) or a polar group (for example, a carboxyl group or a hydroxyl group) into the molecular structure of a raw material monomer and the post-polymerization polymeric backbone, or introduction of a branched structure thereinto.

As used herein, the term "solvent-soluble polyimide" refers to a polyimide resin which is dissolved in an amount of from 10 parts by mass to 100 parts by mass, relative to 100 parts by mass of an organic polar solvent which will be described hereinafter.

Tetracarboxylic Dianhydride

The tetracarboxylic dianhydride may be, for example, a tetracarboxylic dianhydride having an aliphatic cyclic structure.

Specific examples of the tetracarboxylic dianhydride having an aliphatic cyclic structure include 1,2,3,4-butanetetracarboxylic dianhydride, 3,5,6-tricarboxynorbonane-2-acetic dianhydride, 2,3,4,5-tetrahydrofurantetracarboxylic dianhydride, bicyclo[2,2,2]-oct-7-ene-2,3,5,6-tetracarboxylic dianhydride, 4-(2,5-dioxotetrahydrofuran-3-yl)-1,2,3,4-tetrahydronaphth alene-1,2-dicarboxylic dianhydride, 5-(2,5-dioxotetrahydrofuryl)-3-methyl-cyclohexane-1,2-dicarboxylic dianhydride, and 2,3,5-tricarboxylcyclopentylacetic dianhydride.

Further, an aromatic tetracarboxylic anhydride having a bent structure in the molecule may also be used as the tetracarboxylic dianhydride.

Specific examples of the aromatic tetracarboxylic anhydride having a bent structure in the molecule include 3,3',4, 4'-diphenylethertetracarboxylic dianhydride, b is 3,3',4,4'-tetraphenylsilanetetracarboxylic dianhydride, 1,2,3,4-furantetracarboxylic dianhydride, 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenylpropane dianhydride, and 3,3',4,4'-perfluoroisopropylidenediphthalic dianhydride.

These tetracarboxylic dianhydrides may be used alone or in a combination of two or more thereof.

Diamine or Triamine Compound

Examples of the diamine or triamine compound include an aromatic diamine or triamine compound and an aliphatic diamine or triamine compound. Further, the diamine or triamine compound may contain a polar group such as a carboxyl group or a hydroxyl group.

Specific examples of the aromatic diamine or triamine compound include 4,4'-diaminodiphenyl ether, 4,4'-diaminodiphenylmethane, 3,3'-diaminodiphenylmethane, 3,3'-dichlorobenzidine, 4,4'-diaminodiphenyl sulfide, 3,3'-diaminodiphenysulfone, 1,5-diaminonaphthalene, m-phenylenediamine, p-phenylenediamine, 3,3'-dimethyl-4, 4'-biphenyldiamine, 3,3'-dimethylbenzidine, 3,3'-dimethoxybenzidine, 4,4'-diaminodiphenylsulfone, 4,4'-diaminodiphenylpropane, 2,4-bis(β-amino-tert-butyl)toluene, bis(p-β-amino-tert-butylphenyl)ether, bis(p-β-methyl-δ-aminophenyl)benzene, bis-p-(1,1-dimethyl-5-amino-pentyl) benzene, 1-isopropyl-2,4-m-phenylenediamine, m-xylene diamine, p-xylene diamine, 3,5-diaminobenzoic acid, 3,3'-dicarboxy-4,4'-diaminophenylmethane, 2,4,4'-biphenyltriamine, pyridine-2,3,6-triamine, and 1,3,5-triaminobenzene.

Examples of the aliphatic diamine or triamine compound include aliphatic diamines or triamines and alicyclic diamines such as 1,1-metaxylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclo[6,2,1,02.7]-undecylenedimethyldiamine, 4,4'-methylenebis(cyclohexylamine),pentane-1,2,5-triamine, and bis(hexamethylene)triamine.

The diamine or triamine compound may be used alone or in a combination of two or more thereof.

Synthesis of Polyimide

The polyimide can be synthesized by imidation of polyamic acid, which is obtained by reacting the aforementioned tetracarboxylic dianhydride and the diamine or triamine compound in an equivalent amount of a solvent, through a dehydration ring-closing reaction by heat treatment or the like.

The solvent may be, for example, a solvent which dissolves a solvent-soluble polyimide resin. Specific examples of the solvent include solvents containing 50% by mass or more of at least one of N-methyl-2-pyrrolidone, γ-butyrolactone, N,N-dimethylacetamide and N,N-dimethylformamide.

Examples of other solvents (that is, solvents mixed with at least one of N-methyl-2-pyrrolidone, γ-butyrolactone, N,N-dimethylacetamide and N,N-dimethylformamide) include cellosolve solvents such as methyl cellosolve, ethyl cellosolve, propyl cellosolve and butyl cellosolve, alcohol solvents such as methanol, ethanol, propanol and butanol, and ketone solvents such as methyl ethyl ketone, acetone and cyclohexanone.

The imidation treatment may be carried out, for example, by using a thermal imidation method or a chemical imidation method.

An example of the thermal imidation method may be a method of heating a polyamic acid solution at a temperature of from 100° C. to 250° C.

On the other hand, an example of the chemical imidation may be a method of adding a catalyst such as a tertiary amine and a dehydrating agent such as acetic anhydride to a polyamic acid solution. When the chemical imidation method is employed, the reaction is carried out at room temperature (for example, 25° C.) and may also be carried out at a temperature of from 60° C. to 150° C. to promote the chemical reaction. Further, after the reaction is completed, the reaction product can be used with or without removal of the catalyst and the dehydrating agent. The method of removing the catalyst and the dehydrating agent may be, for example, a method of removing the reaction liquid by heating under reduced pressure, or a method of adding the reaction liquid to a poor solvent, followed by re-precipitation of a polyimide resin to remove the catalyst and the dehydrating agent.

<Method for Preparation of Polyurethane-Polyimide Material>

As an example of the method for preparation of a polyurethane-polyimide material, there is a method of polymerizing the acrylic resin and the isocyanate, and if desired, the additive in the presence of polyimide to form a urethane bond, thereby obtaining a polyurethane-polyimide material.

Specifically, for example, there is a method for preparation of a polyurethane-polyimide material which uses the solvent-soluble polyimide as a polyimide, and includes a step of mixing the acrylic resin, the isocyanate, and if desired, the additive in a solvent-soluble polyimide solution in which a solvent-soluble polyimide is dissolved in a solvent, as a raw material of polyurethane and adjusting the mixed solution, a step of applying the resulting mixed solution onto a substrate, if desired, after defoaming the mixed solution under reduced pressure, and a step of heating the mixed solution applied on the surface of the substrate (for example, a polyimide film having a thickness of 90 μm) (for example, heating at 80° C. for 60 minutes and 160° C. for 60 minutes).

For example, the addition amount of polyimide in the preparation of the polyurethane-polyimide material may be in a range of from 0.1 part by mass to 100 parts by mass based on 100 parts by mass of the acrylic resin, preferably from 1 part by mass to 60 parts by mass, and more preferably from 5 parts by mass to 50 parts by mass.

The heating temperature and the heating time in the heating step are not particularly limited as long as the acrylic resin, the isocyanate, and if desired, the added additives are polymerized to form a urethane bond, and are selected depending on the raw material. For example, the heating temperature may be in a range of from 50° C. to 250° C., and the heating time may be in a range of from 30 minutes to 400 minutes. The heating step may be carried out in two or more steps at different temperatures as described above.

<Characteristics of Polyurethane-Polyimide Material>

Elastic Modulus, Return Ratio, and Martens Hardness

The elastic modulus of the resin material according to the present exemplary embodiment is adjusted by controlling, for example, the structure and amount of polyol to be added, type of the crosslinking agent and the like, and may be, for example, in a range of from 50% to 100%. A damage restoration rate is high in a material from which a high numerical value of elastic modulus is obtained.

The return ratio of the resin material according to the present exemplary embodiment is an indicator representing self-restorability of the resin material (a property of restoring the initial state from stress-induced bending upon release of stress, that is, a damage restoration degree). The self-restorability is high in a material from which a high numerical value of return ratio is obtained. Further, the return ratio is adjusted by controlling numbers of carbon atoms and amount of the side chain hydroxyl group, numbers of carbon atoms and addition amount of polyol to be added, and type of crosslinking agent (isocyanate). That is, the return ratio tends to increase in response to an increase in hydroxyl groups of the side chain having large numbers of carbon atoms and an increase in amount of polyol, whereas the return ratio tends to decrease in response to a decrease in addition amount of polyol. The return ratio of the resin material according to the present exemplary embodiment may be, for example, in a range of from 80% to 100%.

The Martens hardness of the resin material according to the present exemplary embodiment depends on desired applications and may be, for example, in a range of from 1 N/mm$^2$ to 40 N/mm$^2$, and preferably from 2 N/mm$^2$ to 20 N/mm$^2$. Further, a resin material having low Martens hardness tends to exhibit easy restoration from damage.

Further, the Martens hardness is adjusted by controlling numbers of carbon atoms and amount of the side chain hydroxyl group, numbers of carbon atoms and addition amount of polyol, and type of crosslinking agent (isocyanate). The Martens hardness tends to decrease in response to an increase in hydroxyl groups of the side chain having large numbers of carbon atoms.

Method of Measuring Elastic Modulus, Return Ratio, and Martens Hardness

Using a FISCHERSCOPE HM2000 (manufactured by Fischer Co., Ltd.) as a measuring apparatus, a sample resin layer formed on a polyimide film through application and polymerization is adhesively fixed to a slide glass which is then set on the measuring apparatus. A load is gradually applied, increasing up to 0.5 mN, to the sample resin layer at room temperature (23° C.) over 15 seconds and maintained at 0.5 mN for 5 seconds. Maximum displacement at that time is taken as (h1). Then, a load is gradually released, decreasing to 0.005 mN over 15 seconds and maintained at 0.005 mN for 1 minute. Displacement at that time is taken as (h2). Based on these values, the return ratio [(h1−h2)/h1] is calculated. In addition, Martens hardness and elastic modulus are calculated from the load displacement curve at this time.

Contact Angle

The contact angle of the resin material according to the present exemplary embodiment may be in a range of from 50° to 150°, and preferably from 70° to 150°. The contact angle is adjusted by controlling the amount of fluorine atoms contained in the acrylic resin and the long chain polyol.

Method of Measuring Contact Angle

The contact angle is measured by dropping 5 μL drops of water on a solid surface of a resin material using a syringe, and measuring a contact angle at the contact surface between the resin material and water, using a contact angle meter (Model No. CA-S-Roll type, manufactured by Kyowa Interface Science Co., Ltd.).

Although the above-mentioned polyurethane-polyimide material contains, as described before, at least one of the reaction product and the mixture of polyurethane and polyimide, it may be considered that heat-induced changes in properties of the resin material do not readily occur when the resin material contains the reaction product of polyurethane and polyimide.

As the method of measuring whether or not the polyurethane-polyimide material incorporated in the resin material contains the reaction product, for example, there is a method of analyzing urethane bonds and imide bonds through IR spectrometry, solid NMR method, or the like.

<Uses of Resin Material>

The resulting resin material of the present exemplary embodiment is used, for example, as a surface protecting layer for endless belts, rolls, platens, and photoreceptors used in image forming apparatuses. The resin material of the present exemplary embodiment is used as a surface protecting layer particularly for fixing belts, fixing rolls, and transfer belts of fixing units used in image forming apparatuses.

Hereinafter, members and devices using the resin material according to the present exemplary embodiment will be described.

[Endless Belt]

Figure 2:
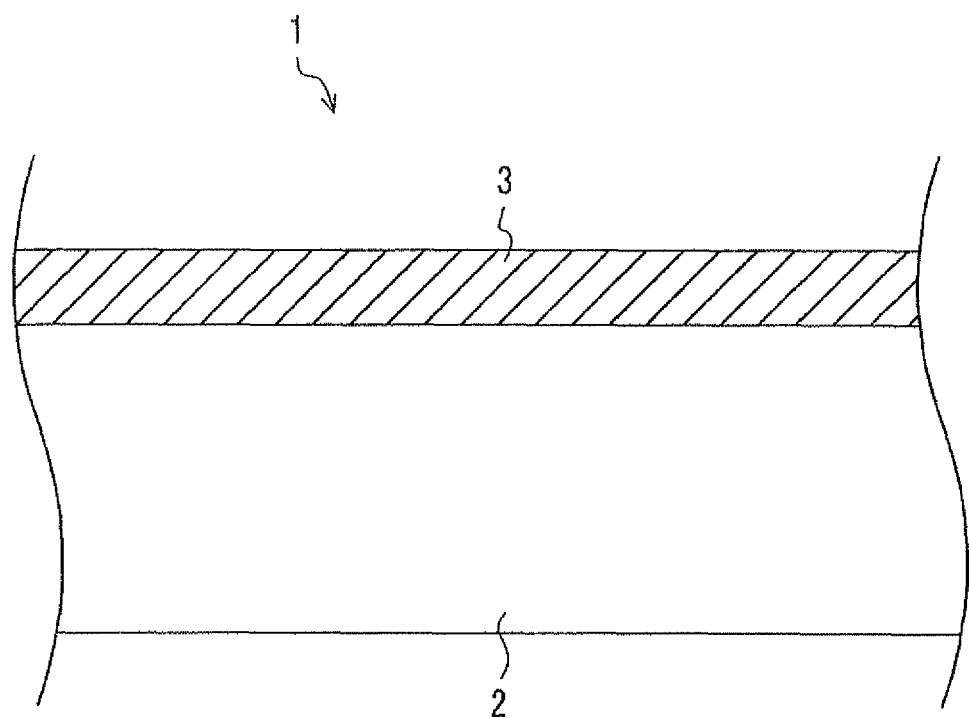
FIG. 2 is a cross-sectional view of an endless belt according to the present exemplary embodiment.

FIG. 1 is a perspective view showing an endless belt according to the present exemplary embodiment (a part is represented by a cross section), and FIG. 2 is a cross-sectional view of the endless belt as viewed from the direction of an arrow mark A in FIG. 1.

As shown in FIG. 1 and FIG. 2, the endless belt 1 of the present exemplary embodiment is an endless-shaped belt having a substrate 2 and a surface layer 3 laminated on the surface of the substrate 2.

Further, as the surface layer 3, the aforementioned resin material according to the present exemplary embodiment is applied.

Examples of the use of the endless belt 1 include applications for fixing belts, transfer belts, recording medium-conveying belts and the like in image forming apparatuses.

Hereinafter, an application of the endless belt 1 as a fixing belt in an image forming apparatus will be described.

An example of the material used for the substrate 2 may be a heat-resistant material. Specifically, the material for the substrate 2 is selected from a variety of known plastic materials and metal materials.

Among the plastic materials, plastic materials generally called engineering plastic may be used. Examples thereof include fluororesin, polyimide (PI), polyamideimide (PAT), polybenzimidazole (PBI), polyether ether ketone (PEEK), polysulfone (PSU), polyether sulfone (PES), polyphenylene sulfide (PPS), polyetherimide (PEI), and wholly aromatic polyester (liquid crystal polymer). Among these, thermosetting polyimide, thermoplastic polyimide, polyamideimide, polyetherimide, fluororesin and the like may be used from the viewpoint of excellent mechanical strength, heat resistance, wear resistance, chemical resistance or the like.

The metal material used in the substrate 2 is not particularly limited and employs a variety of metals or alloy materials. For example, SUS, nickel, copper, aluminum, iron or the like is appropriately used. Furthermore, the heat resistant resin or the metallic material may be multilayered.

Hereinafter, application of the endless belt 1 as an intermediate transfer belt or a recording medium conveying belt will be described.

Examples of the material used for the substrate 2 include a polyimide resin, a polyamideimide resin, a polyester resin, a polyamide resin, and a fluororesin. Further, the substrate may be formed into a seamless form or a form with a seam as long as it is formed into a ring (endless) form. A thickness of the substrate 2 may be in a range of, for example, from 0.02 to 0.2 mm.

Where the endless belt 1 is used as an intermediate transfer belt or a recording medium conveying belt of an image forming apparatus, for example, surface resistivity may be controlled in the range of from $1\times10^{9}\Omega/\square$ to $1\times10^{14}\Omega/\square$, and volume resistivity may be controlled in the range of from $1\times10^{8}$ $\Omega\cdot cm$ to $1\times10^{13}$ $\Omega\cdot cm$. In this connection, as required, carbon black such as Ketjen black or acetylene black, graphite, metal or alloys such as aluminum, nickel or copper alloy, metal oxides such as tin oxide, zinc oxide, potassium titanate, tin oxide-indium oxide or tin oxide-antimony oxide composite oxide, a conductive polymer such as polyaniline, polypyrrole, polysulfone or polyacetylene may be added as a conductive agent to the substrate 2 or the surface layer 3 (herein, the term "conductive" in the polymer means that volume resistivity is less than $10^{7}$ $\Omega\cdot cm$). These conductive agents may be used alone or in a combination of two or more thereof.

Herein, the surface resistivity and the volume resistivity are measured using a HIRESTA UPMCP-450 model UR Probe (manufactured by Dia Instrument Co., Ltd.) under an environment of 22° C. and 55% RH, according to JIS-K6911.

In the case of a fixing application, the endless belt 1 may include an elastic layer between the substrate 2 and the surface layer 3. As the material for the elastic layer, for example, various rubber materials are used. Examples of various rubber materials include urethane rubber, ethylene/propylene rubber (EPM), silicone rubber, and fluororubber (FKM), particularly silicone rubber excellent in heat resistance and processability. Examples of the silicone rubber include RTV silicone rubber and HTV silicone rubber. Specific examples thereof include polydimethylsilicone rubber (MQ), methylvinyl silicone rubber (VMQ), methylphenyl silicone rubber (PMQ), and fluoro silicone rubber (FVMQ).

When the endless belt 1 is used as a fixing belt in an electromagnetic induction type fixing unit, a heat generating layer may be provided between the substrate 2 and the surface layer 3.

An example of the material used for the heat generating layer may be a non-magnetic metal. Specific examples thereof include metal materials such as gold, silver, copper, aluminum, zinc, tin, lead, bismuth, beryllium, antimony, and alloys thereof (alloys including them).

The film thickness of the heat generating layer may be, for example, in a range of from 5 to 20 μm, preferably 7 to 15 μm, and more preferably from 8 to 12 μm.

[Roll]

Next, the roll according to the present exemplary embodiment will be described. The roll of the present exemplary embodiment is a cylindrical roll having a substrate and a surface layer laminated on the surface of the substrate.

Further, as the surface layer, the aforementioned resin material according to the present exemplary embodiment is applied.

Examples of the use of the cylindrical roll include applications for a fixing roll, recording medium conveying roll and the like in image forming apparatuses.

Hereinafter, application of the cylindrical roll as a fixing roll in an image forming apparatus will be described.

Figure 4:
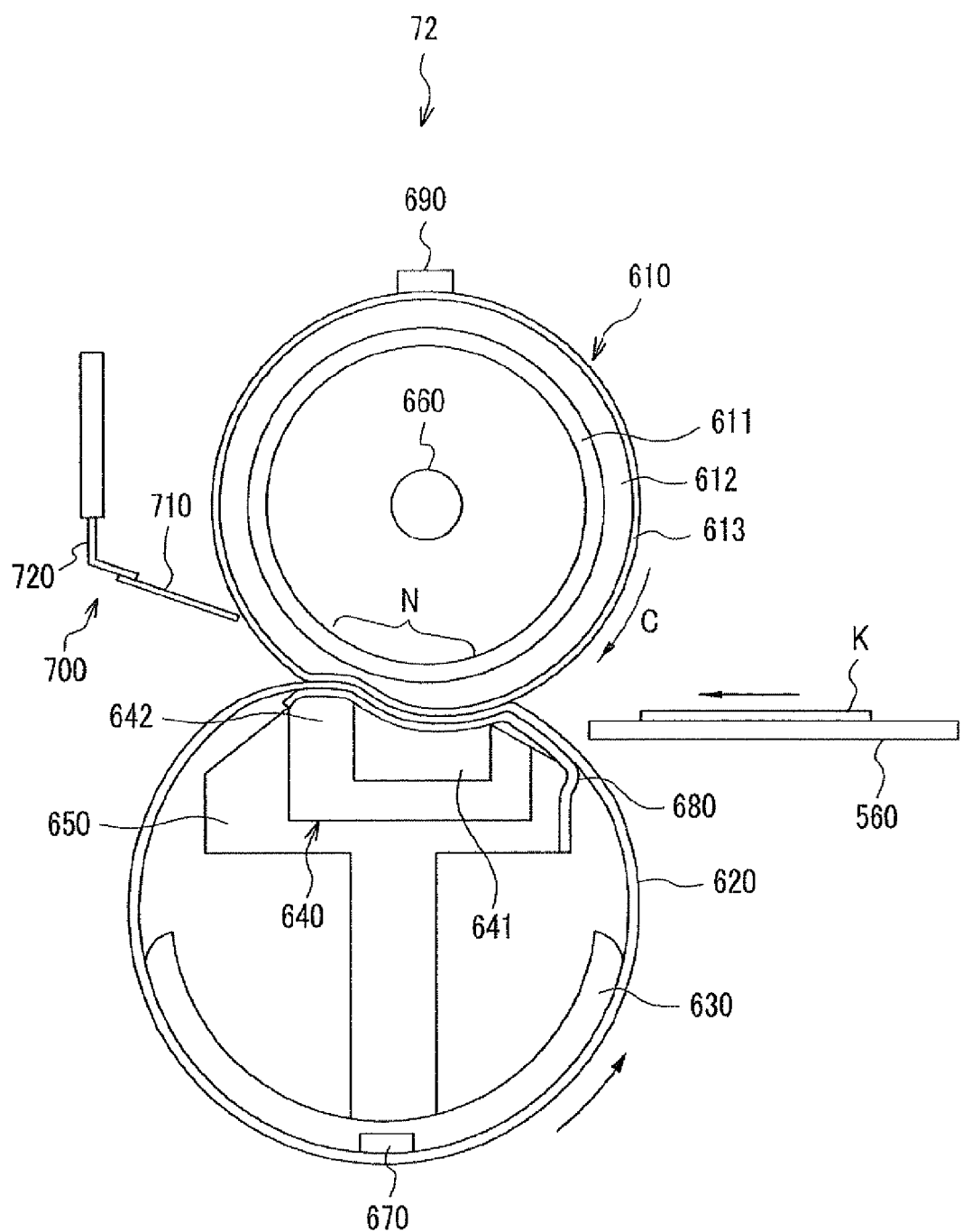
FIG. 4 is a schematic configuration diagram showing an image fixing unit using an endless belt according to the present exemplary embodiment.

Fixing roll 610 as a fixing member, shown in FIG. 4, is not particularly limited with regard to the shape, structure and size thereof, and is configured with provision of a surface layer 613 on a cylindrical core 611. Further, as shown in FIG. 4, an elastic layer 612 may be provided between the core 611 and the surface layer 613.

Examples of the material of the cylindrical core 611 include metals such as aluminum (for example, A-5052), SUS, iron or copper, an alloy, ceramics and FRM. The fixing unit 72 of the present exemplary embodiment is made of cylindrical body having an outer diameter of 25 mm, a thickness of 0.5 mm, and a length of 360 mm.

A material of an elastic layer 612 is selected from known materials and any material may be used as long as it is an elastic body with high heat resistance. In particular, an elastic body such as a rubber or an elastomer having rubber hardness substantially from 15 to 45° (JIS-A) may be used. For example, a silicone rubber and a fluororubber may be exemplified.

In the present exemplary embodiment, among these materials, a silicone rubber may be used from the viewpoint of having a smaller surface tension and more excellent elasticity. As the silicone rubber, for example, RTV silicone rubber and HTV silicone rubber are exemplified. Specific examples thereof include polydimethyl silicone rubber (MQ), methylvinyl silicone rubber (VMQ), methylphenyl silicone rubber (PMQ) and fluoro silicone rubber (FVMQ).

A thickness of an elastic layer 612 may be 3 mm or less, or in the range of from 0.5 to 1.5 mm. In a fixing unit 72 in the first exemplary embodiment, HTV silicone rubber having rubber hardness of 35° (JIS-A) is coated on a core at a thickness of 72 μm.

A thickness of the surface layer 613 may be, for example, in the range of from 5 to 50 μm, and preferably from 10 to 30 μm.

As a heating source for heating a fixing roll 610, as mentioned above, for example, a halogen lamp 660 is used. Any halogen lamp may be used according to an object without particular limitation as long as it has a shape and a structure that may be housed inside of the core 611. A surface temperature of the fixing roll 610 heated by the halogen lamp 660 is measured with a thermosensor 690 disposed on the fixing roll 610 and a temperature thereof is controlled to be constant by the controller. The thermosensor 690 is not particularly limited. For example, a thermistor and a temperature sensor are exemplified.

Image Forming Apparatus, and Image Fixing Unit

First Exemplary Embodiment

Figure 3:
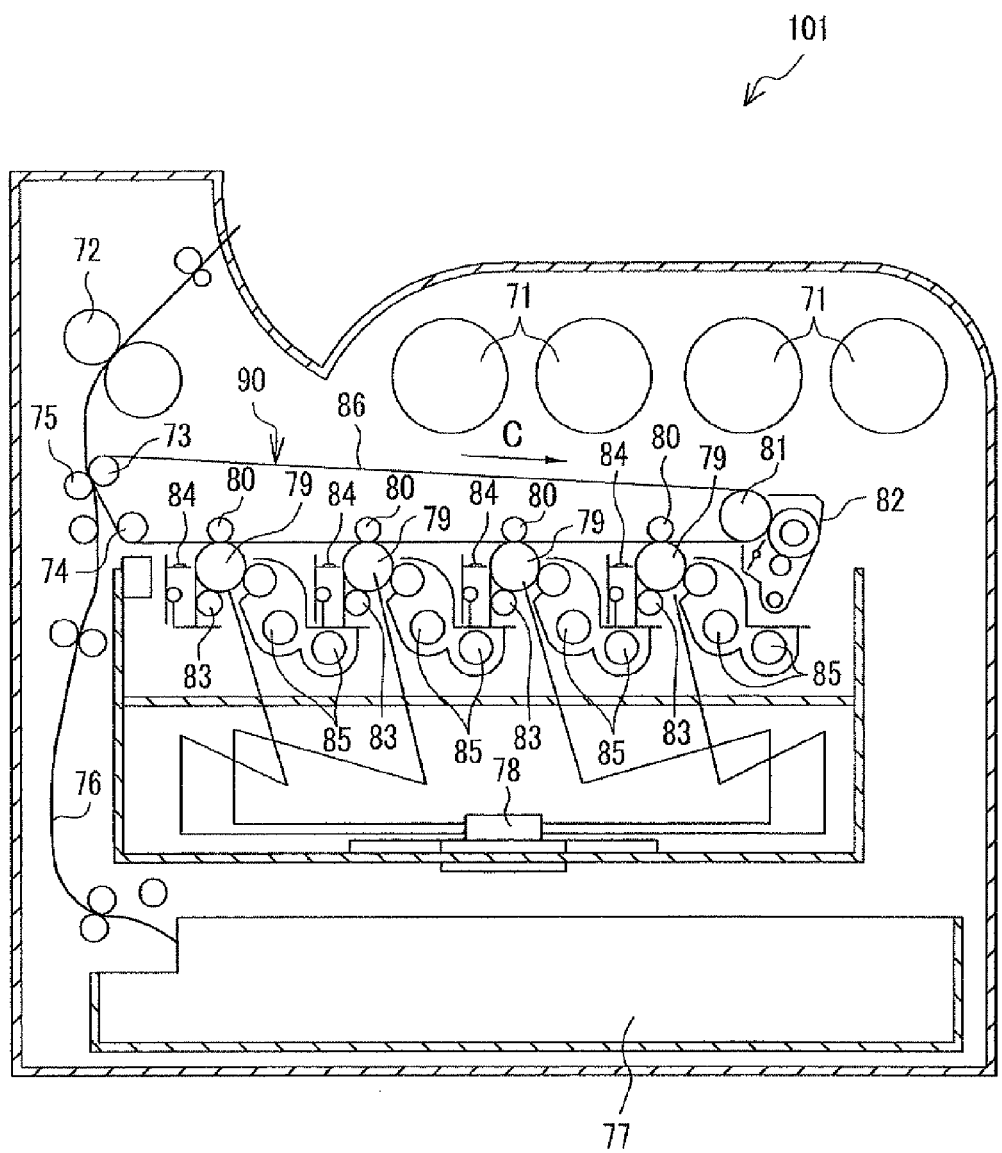
FIG. 3 is a schematic configuration diagram showing an image forming apparatus using an endless belt according to the present exemplary embodiment.

Next, an image forming apparatus of a first exemplary embodiment that uses the endless belt of the present exemplary embodiment and the roll of the present exemplary embodiment will be described. FIG. 3 is a schematic diagram for explaining a main portion of a tandem image forming apparatus that includes the endless belt according to the present exemplary embodiment as a pressure belt of a fixing unit and also includes the roll according to the present exemplary embodiment as a fixing roll of a fixing unit.

Specifically, an image forming apparatus 101 includes a photoreceptor 79 (electrostatic latent image holding member), a charging roll 83 for charging a surface of the photoreceptor 79, a laser generator 78 (electrostatic latent image forming unit) that exposes a surface of the photoreceptor 79 to form an electrostatic latent image, a developing unit 85 (developing unit) that develops a latent image formed on a surface of the photoreceptor 79 with a developer to form a toner image, an intermediate transfer belt 86 (intermediate transfer medium) to which a toner image formed by the developing unit 85 is transferred from the photoreceptor 79, a first transfer roll 80 (first transfer unit) that transfers a toner image to the intermediate transfer belt 86, a photoreceptor cleaning member 84 for removing toner or dust attached to the photoreceptor 79, a second transfer roll 75 (second transfer unit) for transferring a toner image on the intermediate transfer belt 86 to a recording medium, and a fixing unit 72 (fixing unit) for fixing a toner image on a recording medium. The first transfer roll 80 may be disposed immediately above the photoreceptor 79 as shown in FIG. 3 or may be disposed at a position slightly displaced from immediately above the photoreceptor 79.

Furthermore, a configuration of an image forming apparatus 101 shown in FIG. 3 will be described in detail.

In the image forming apparatus 101, a charging roll 83, a developing unit 85, a first transfer roll 80 disposed via an intermediate transfer belt 86, and a photoreceptor cleaning member 84 are disposed counterclockwise around the photoreceptor 79, and one set of the members forms a developing unit corresponding to one color. For every developing unit, a toner cartridge 71 that replenishes a developer to a developing unit 85 is disposed, and, for a photoreceptor 79 of each of the developing units, a laser generator 78 that illuminates laser light according to image information on a surface of a photoreceptor 79 on a downstream side of a charging roll 83 (in a rotating direction of a photoreceptor 79) and on an upstream side of a developing unit 85 is disposed.

Four developing units corresponding to four colors (for example, cyan, magenta, yellow, and black) are disposed in series in a horizontal direction in an image forming apparatus 101, and an intermediate transfer belt 86 is disposed so as to go through transfer regions of photoreceptors 79 and first transfer rolls 80 of four developing units. An intermediate transfer belt 86 is bridged with a tension applied by a support roll 73, a support roll 74, and a driving roll 81, which are disposed on an inner surface side of the intermediate transfer belt 86 counterclockwise in the above-mentioned order, and forms a belt supporting unit 90. Four first transfer rolls are located on a downstream side of a support roll 73 (in a direction of rotation of an intermediate transfer belt 86) and on an upstream side of a support roll 74. Furthermore, on an opposite side of a driving roll 81 via an intermediate transfer belt 86, a transfer cleaning member 82 for cleaning an outer peripheral surface of an intermediate transfer belt 86 is disposed so as to come into contact with a driving roll 81.

On an opposite side of a support roll 73 via an intermediate transfer belt 86, a second transfer roll 75 for transferring a toner image formed on an outer peripheral surface of an intermediate transfer belt 86 to a surface of a recording paper sheet transported from a paper supply portion 77 via a paper sheet path 76 is disposed so as to come into contact with a support roll 73.

At a bottom of an image forming apparatus 101, a paper sheet supply portion 77 for housing a recording medium is disposed, and a recording medium is supplied so as to go through a contact portion of a support roll 73 and a second transfer roll 75, which form a second transfer portion, from a paper sheet supply portion 77 via a paper sheet path 76. A recording medium which has gone through the contact portion is further transported by a not-shown conveying unit so as to go through a contact portion of a fixing unit 72 and finally ejected outside of an image forming apparatus 101.

Next, an image forming method that uses an image forming apparatus 101 shown in FIG. 3 will be described. A toner image is formed for every developing unit. After a surface of a photoreceptor 79 that rotates counterclockwise is charged by a charging roll 83, a latent image (electrostatic latent image) is formed on a surface of the charged photoreceptor 79 by a laser generator 78 (exposure unit), then, the latent image is developed with a developer supplied from a developing unit 85 to form a toner image, and a toner image transported to a contact portion of a first transfer roll 80 and a photoreceptor 79 is transferred to an outer peripheral surface of an intermediate transfer belt 86 that rotates in a direction of an arrow mark C. A photoreceptor 79 from which a toner image is transferred is cleaned by a photoreceptor cleaning member 84 to remove toner and dust attached on a surface thereof to prepare for forming a next toner image.

A toner image developed by every developing unit of each of colors, which is in a state of being sequentially superposed on an outer peripheral surface of an intermediate transfer belt 86 so as to correspond to image information, is transported to a second transfer portion, and transferred by a second transfer roll 75 to a surface of a recording paper sheet transported from a paper sheet supply portion 77 through a paper sheet path 76. A recording paper sheet on which a toner image is transferred is pressurized under heating to fix when going through a contact portion of a fixing unit 72 to form an image on a surface of a recording medium, followed by being ejected outside of an image forming apparatus.

—Fixing Unit (Image Fixing Unit)—

FIG. 4 is a schematic configurational diagram of a fixing unit 72 disposed inside of an image forming apparatus 101 according to the present exemplary embodiment. A fixing unit shown in FIG. 4 includes a fixing roll 610 as a rotation-driving rotating body, an endless belt 620 (pressure belt), and a pressure pad 640 that is a pressure member that pressurizes a fixing roll 610 through an endless belt 620. The pressure pad 640 may relatively pressurize an endless belt 620 and a fixing roll 610. Accordingly, an endless belt 620 side may be pressurized by a fixing roll 610 or a fixing roll 610 side may be pressurized by an endless belt 620.

Inside of a fixing roll 610, a halogen lamp 660 as an example of a heating unit that heats an unfixed toner image in a nip region is disposed. As a heating unit, other heating members that generate heat may be used without being limited to a halogen lamp.

On the other hand, on a surface of a fixing roll 610, a thermosensor 690 is disposed in contact therewith. Based on temperature measurements by the thermosensor 690, a halogen lamp 660 is controlled to be on or off to maintain a surface temperature of a fixing roll 610 at a preset temperature (for example, 150° C.).

An endless belt 620 is supported to be freely rotatable by a pressure pad 640 disposed inside thereof, a belt running guide 630 and a not-shown edge guide. In a nip region N, an endless belt 620 is disposed in contact with a fixing roll 610 in a state pressurized relative to a fixing roll 610.

A pressure pad 640 is disposed inside of an endless belt 620 in a state pressurized against a fixing roll 610 through an endless belt 620 to form a nip region N with a fixing roll 610. In a pressure pad 640, a pre-nip member 641 is disposed on an inlet side of a nip region N to secure a wide nip region N and a peeling nip member 642 is disposed on an exit side of a nip region N to apply strain to a fixing roll 610.

Furthermore, a low friction sheet 680 is disposed on a surface of a pre-nip member 641 and a peeling nip member 642 that comes into contact with an endless belt 620 to reduce sliding resistance between an inner peripheral surface of an endless belt 620 and a pressure pad 640. A pressure pad 640 and a low friction sheet 680 are held by a metallic holder 650.

Furthermore, a belt running guide 630 is attached to a holder 650 so that an endless belt 620 may rotate smoothly. That is, a belt running guide 630 slides with an inner peripheral surface of an endless belt 620; accordingly, a belt running guide 630 is formed of a material with a small static friction coefficient. Furthermore, a belt running guide 630 is formed of a material with low thermal conductivity in order for it to be difficult to deprive an endless belt 620 of heat.

A fixing roll 610 is rotated in a direction of an arrow mark C by a not-shown driving motor and following the rotation an endless belt 620 rotates in a direction opposite to a rotation direction of a fixing roll 610. That is, a fixing roll 610 rotates clockwise in FIG. 4, whereas an endless belt 620 rotates counterclockwise.

A paper sheet K having an unfixed toner image is guided by a fixing inlet guide 560 and transported to a nip region N. When a paper sheet K goes through a nip region N, a toner image on a paper sheet K is fixed owing to pressure applied to a nip region N and heat supplied from a fixing roll 610.

In a fixing unit 72, a nip region N is secured owing to a concave pre-nip member 641 following an outer peripheral surface of a fixing roll 610.

Furthermore, in a fixing unit 72 according to the present exemplary embodiment, by disposing a peeling nip member 642 projected relative to an outer peripheral surface of a fixing roll 610, a strain on a fixing roll 610 may be made locally larger in an exit region of a nip region N. Accordingly, a paper sheet K after being fixed is peeled off from a fixing roll 610.

As an auxiliary unit for peeling, a peeling member 700 is disposed on a downstream side of a nip region N of a fixing roll 610. A peeling member 700 is held by a holder 720 in a state where a peeling baffle 710 comes close to a fixing roll 610 in a direction (counter direction) opposite to a rotation direction of a fixing roll 610.

In what follows, members other than an endless belt 620 and a fixing roll 610 used in a fixing unit 72 according to the present exemplary embodiment will be described in detail.

A pressure pad 640 disposed inside of an endless belt 620 is, as mentioned above, constituted of a pre-nip member 641 and a peeling nip member 642 and supported by a holder 650 so that a spring or an elastic body may press a fixing roll 610 at a load of, for example, 32 kgf. A surface on a side of a fixing roll 610 is formed with a concave curved surface following an outer peripheral surface of a fixing roll 610. The respective materials may be constituted of a heat resistant material.

A pressure pad 640 disposed inside of an endless belt 620 is not particularly limited in a shape or a material as long as a pressure pad 640 has a function of pressurizing a fixing roll 610 via an endless belt 620 to form, between an endless belt 620 and a fixing roll 610, a nip region N where a paper sheet K holding an unfixed toner image goes through. Furthermore, in addition to a pressure pad 640, a pressure roller rotating while pressing against a fixing roll 610 may be disposed side by side.

In a pre-nip member 641, a heat resistant elastomer such as silicone rubber or fluororubber or an elastic body such as a plate spring may be used. Among these materials, silicone rubber may be used from the viewpoint of excellent elasticity. As the silicone rubber, for example, RTV silicone rubber and HTV silicone rubber are exemplified. Specifically, examples thereof include polydimethyl silicone rubber (MQ), methylvinyl silicone rubber (VMQ), methylphenyl silicone rubber (PMQ) and fluoro silicone rubber (FVMQ). Silicone rubber having JIS-A hardness from 10 to 40° may be appropriately used from the viewpoint of hardness. A shape, structure and size of an elastic body are selected depending on an object without particular limitation. In a fixing unit 72 of the present exemplary embodiment, silicone rubber having a width of 10 mm, a thickness of 5 mm and a length of 320 mm is used.

A peeling nip member 642 is formed of a heat resistant resin such as polyphenylene sulfide (PPS), polyimide, polyester or polyamide or a metal such as iron, aluminum or SUS.

The peeling nip member is formed to have a convex curved surface where a shape of an outer surface in a nip region N has a constant curvature radius. In a fixing unit 72 of the present exemplary embodiment, an endless belt 620 is lapped by a pressure pad to a fixing roll 610 at a winding angle of 40° to form a nip region N having a width of 8 mm.

A low friction sheet 680 is disposed to reduce sliding resistance (frictional resistance) between an inner peripheral surface of an endless belt 620 and a pressure pad 640. Therefore, a material with a small friction coefficient and excellent in wear resistance and heat resistance is suitable.

As a material of the low friction sheet 680, various materials such as metals, ceramics and resins are adopted. Specifically, in addition to a fluororesin that is a heat resistant resin, polyether sulfone (PES), polybutylene terephthalate (PBT), liquid crystal polymer (LCP), polyphenylene sulfide (PPS) and polyethylene terephthalate (PET), a natural material such as 6-nylon or 6,6-nylon and a material obtained by adding carbon or glass fiber thereto are used.

Among these, a fluororesin sheet in which a side of a contact surface with an endless belt 620 has small sliding resistance and a surface holding a lubricant has a fine irregular shape may be used.

Specific examples thereof include a sintered PTFE resin sheet, a glass fiber sheet impregnated with Teflon®, a layered sheet obtained by sandwiching by heating and fusing a skived film sheet made of a fluororesin to a glass fiber, and a fluororesin sheet having streaky irregularity.

A low friction sheet 680 may be constituted separately from a pre-nip member 641 or a peeling nip member 642 or may be constituted integrally with a pre-nip member 641 or a peeling nip member 642.

Furthermore, in a holder 650, over a longer direction of a fixing unit 72, a lubricant coating member 670 is disposed. A lubricant coating member 670 is disposed so as to come into contact with an inner peripheral surface of an endless belt 620 to supply an appropriate amount of a lubricant. Thereby, a lubricant is supplied to a sliding portion between an endless belt 620 and a low friction sheet 680 to further reduce sliding resistance between an endless belt 620 and a pressure pad via a low friction sheet 680 to realize a smooth rotation of an endless belt 620. Furthermore, wear of an inner peripheral surface of an endless belt 620 and a surface of a low friction sheet 680 as well is suppressed.

As a lubricant, silicone oil may be used. Examples of the silicone oil include dimethyl silicone oil, organometallic salt-added dimethyl silicone oil, hindered amine-added dimethyl silicone oil, organometallic salt- and hindered amine-added dimethyl silicone oil, methylphenyl silicone oil, amino-modified silicone oil, organometallic salt-added amino-modified silicone oil, hindered amine-added amino-modified silicone oil, carboxy-modified silicone oil, silanol-modified silicone oil, and sulfone acid-modified silicone oil. Among these, amino-modified silicone oil may be used because it is excellent in wettability.

In an image fixing unit 72 of the present exemplary embodiment, a lubricant is supplied to an inner peripheral surface of an endless belt 620 from a lubricant coating member 670. However, an embodiment where a lubricant coating member and a lubricant are not used as well may be adopted.

Methylphenyl silicone oil or fluorooil (perfluoropolyether oil, modified perfluoropolyether oil) may be appropriately used. An antioxidant may also be added to silicone oil. Other than what is mentioned above, synthetic lubricant grease obtained by mixing a solid material and a liquid, for example, silicone grease, fluorogrease and combinations thereof, may be used. In a fixing unit 72 of the present exemplary embodiment, amino-modified silicone oil having a viscosity of 300 cs (KF 96, manufactured by Shin-Etsu Chemical Co., Ltd.) is used.

A belt running guide 630 slides, as mentioned above, with an inner peripheral surface of an endless belt 620. Accordingly, a material with a small frictional coefficient and with low thermal conductivity in order for it to be difficult to deprive an endless belt 620 of heat may be used, and a heat resistant resin such as PFA or PPS may be used.

Second Exemplary Embodiment

An image forming apparatus of a second exemplary embodiment is an embodiment where, in place of a fixing unit 72 disposed in an image forming apparatus 101 of the first exemplary embodiment, a fixing unit provided with a fixing belt (endless belt of the present exemplary embodiment) having a heating source and a pressure roll (roll of the present exemplary embodiment) is used. Items other than that of a fixing unit being different are the same as those mentioned above; accordingly, descriptions thereof will be omitted.

—Fixing Unit (Image Fixing Unit)—

Figure 5:
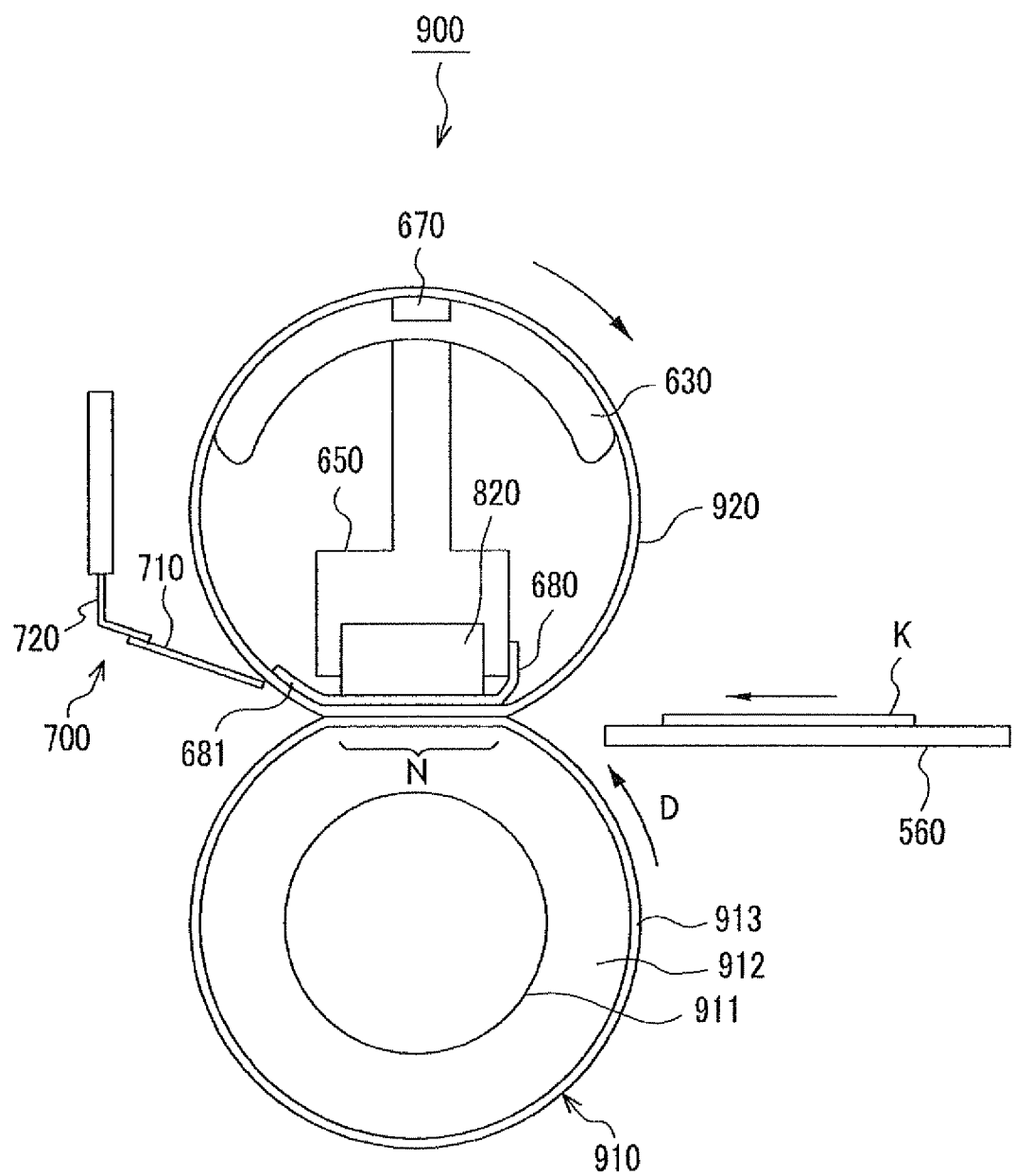
FIG. 5 is a schematic configuration diagram showing another image fixing unit using an endless belt according to the present exemplary embodiment.

FIG. 5 is a schematic configurational diagram of a fixing unit of the present exemplary embodiment. Specifically, FIG. 5 is a fixing unit which includes an endless belt according to the present exemplary embodiment as a fixing belt, and a roll according to the present exemplary embodiment as a pressure roll. Concerning configurations the same as a fixing unit according to a first exemplary embodiment, the same reference numerals will be given and detailed descriptions thereof will be omitted.

As shown in FIG. 5, a fixing unit 900 according to a second exemplary embodiment is configured by including a fixing belt 920 as an endless belt and a pressure roll 910 as one example of a rotating body that is rotation-driven. A fixing belt 920 is constituted in the same manner as the foregoing endless belt 620.

A fixing belt 920 is disposed on a side of a toner image holding surface of a paper sheet K, a ceramic heater 820 that is a resistance heater as one example of a heating unit is disposed inside of a fixing belt 920, and thereby heat is supplied from a ceramic heater 820 to a nip region N.

In a ceramic heater 820, a surface on a side of a pressure roll 910 is formed to be flat. A ceramic heater 820 is disposed in a state pressed against a pressure roll 910 through a fixing belt 920 to form a nip region N. Accordingly, a ceramic heater 820 works also as a pressure member. A paper sheet K which has gone through a nip region N is peeled off from a fixing belt 920 owing to a change of curvature of a fixing belt 920 at an exit region (peeling nip region) of a nip region N.

Furthermore, between an inner peripheral surface of a fixing belt 920 and a ceramic heater 820, a low friction sheet 680 is disposed to reduce sliding resistance between an inner peripheral surface of a fixing belt 920 and a ceramic heater 820. The low friction sheet 680 may be constituted either separately from a ceramic heater 820 or integrally with a ceramic heater 820.

On the other hand, a pressure roll 910 is disposed so as to face a fixing belt 920 and rotated in a direction of an arrow mark D by a not-shown driving motor, and a fixing belt 920 is rotated following the rotation. A pressure roll 910 is constituted by layering a core (cylindrical cored bar) 911, a heat resistant elastic layer 912 coating an outer peripheral surface of a core 911 and a releasing layer 913 formed of a heat resistant resin coating or a heat resistant rubber coating, and, as required, the respective layers are rendered semi-conductive by addition of carbon black or the like in order to prevent toner offset.

As an auxiliary unit for peeling, a peeling member 700 may be disposed on a downstream side of a nip region N of a fixing belt 920. A peeling member 700 is held by a holder 720 in a state where a peeling baffle 710 comes close to a fixing belt 920 in a direction (counter direction) opposite to a rotation direction of a fixing belt 920.

A paper sheet K having an unfixed toner image thereon is guided by a fixing inlet guide 560 to a nip region N of a fixing unit 900. When a paper sheet K goes through a nip region N, a toner image on a paper sheet K is fixed owing to pressure applied to a nip region N and heat supplied from a ceramic heater on a side of a fixing belt 920.

Herein, in a fixing unit 900 of the present exemplary embodiment, a pressure roll 910 is formed into an inverse crown shape (flare shape) where outer diameters at both ends are larger than an outer diameter of a center portion, a fixing belt 920 as well has an irregular shape on an inner surface thereof, and the irregular shape is constituted so as to expand and deform into a shape following a surface shape of the pressure roll 910 in a nip region. By thus configuring, when a paper sheet goes through a nip region, a tensile force acts in a width direction from a center portion toward both end portions of a paper sheet by a pressure roll 910 to expand a paper sheet, and a length in a surface width direction of a fixing belt 920 expands as well.

Accordingly, in a fixing unit 900 of the present exemplary embodiment as well, in an entire region over from a center region to both end portions, a fixing belt 920 is inhibited from slipping relative to a paper sheet K.

As a source of heat, other than a ceramic heater 820, a halogen lamp disposed inside of a fixing belt 920 or electromagnetic induction heat generation caused by an electromagnetic induction coil disposed inside or outside of a fixing belt 920 may be used.

Inside of a fixing belt 920, in addition to a flat pressure member, a pressure roller that rotates with pressure applying against a pressure roll 910 may be disposed side by side.

EXAMPLES

Hereinafter, the present invention will be described in more detail with reference to the following examples, but the invention is by no means limited thereto. In the following examples, the "part (s)" and "%" refer to "part(s) by mass" and "% by mass" respectively, unless otherwise specifically indicated.

Preparation of Sample

Example 1

Preparation of Acrylic Resin Prepolymer Solution 1

2-hydroxyethyl methacrylate: 60 parts
2-(perfluorohexyl)ethyl acrylate: 40 parts
Azobisisobutyronitrile (AIBN, polymerization initiator): 6 parts
Methyl ethyl ketone: 100 parts The foregoing components are placed in a dropping funnel and added dropwise with stirring over 3 hours to 100 parts of methylethylketone which is warmed to a temperature of 80° C. under nitrogen reflux, followed by polymerization. In addition, a liquid including 50 parts of methylethylketone and 2 parts of AIBN is added dropwise thereto over 1 hour, followed by further stirring for 1 hour to complete the reaction.

During the reaction, the temperature is maintained at 80° C. and stirring is continued. The reaction liquid is concentrated to a 40% concentration to synthesize an acrylic resin prepolymer solution 1 where an acrylic resin prepolymer is dissolved in a solvent.

<Formation of Resin Layer Sample A1>

Acrylic resin prepolymer solution 1: 100 parts
Polyimide solution 1 (trade name: UNIDIC V-8000, concentration: 40%, manufactured by DIC Corporation): 30 parts
Isocyanate solution 1 (trade name: DURANATE TPA-B80E, effective NCO %:12.5%, manufactured by Asahi Kasei Chemicals Corporation): 62 parts Among the foregoing components, first, the acrylic resin prepolymer solution and the polyimide solution are mixed, and the isocyanate solution 1 is added thereto, followed by defoaming for 10 minutes under reduced pressure. The resulting residue is cast into a polyimide film having a thickness of 90 μm, and cured at 80° C. for 1 hour and then at 150° C. for 60 minutes to obtain a resin layer sample A1 having a film thickness of 40 μm. According to the foregoing method, it is demonstrated that the obtained resin layer sample contains the reaction product of polyurethane and polyimide.

Example 2

Formation of Resin Layer Sample A2

Acrylic resin prepolymer solution 1: 100 parts
Polyimide solution 2 (trade name: UNIDIC V-8003, concentration: 40%, manufactured by DIC Corporation): 30 parts
Isocyanate solution 1 (trade name: DURANATE TPA-B80E, effective NCO %:12.5%, manufactured by Asahi Kasei Chemicals Corporation): 62 parts A resin layer sample A2 having a film thickness of 40 μm is obtained in the same manner as in Example 1, except that the foregoing components are used. According to the foregoing method, it is demonstrated that the obtained resin layer sample contains the reaction product of polyurethane and polyimide.

Example 3

Preparation of Acrylic Resin Prepolymer Solution 2

2-hydroxy ethylmethacrylate: 50 parts
2-(perfluoro hexyl)ethylacrylate: 35 parts
Azobisisobutyronitrile (AIBN, polymerization initiator): 6 parts
Methyl ethyl ketone: 100 parts The foregoing components are placed in a dropping funnel and added dropwise with stirring over 3 hours to 15 parts of silicone macromonomer (trade name: FM-0721, manufactured by Chisso Corporation,) and 100 parts of methylethylketone which are warmed to a temperature of 80° C. under nitrogen reflux, followed by polymerization. In addition, a liquid including 50 parts of methylethylketone and 2 parts of AIBN is added dropwise thereto over 1 hour, followed by further stirring for 1 hour to complete the reaction. During the reaction, the temperature is maintained at 80° C. and stirring is continued. The reaction liquid is concentrated to a 40% concentration to synthesize an acrylic resin prepolymer solution 2 where an acrylic resin prepolymer is dissolved in a solvent.

<Formation of resin layer sample A3>

Acrylic resin prepolymer solution 2: 100 parts

Polyimide solution 1 (trade name: UNIDIC V-8000, concentration: 40%, manufactured by DIC Corporation): 30 parts Isocyanate solution 1 (trade name: DURANATE TPA-B80E, effective NCO %: 12.5%, manufactured by Asahi Kasei Chemicals Corporation): 52 parts Among the foregoing components, first, the acrylic resin prepolymer solution and the polyimide solution are mixed, and the isocyanate solution 1 is added thereto, followed by defoaming for 10 minutes under reduced pressure. The resulting residue is cast into a polyimide film having a thickness of 90 μm, and cured at 80° C. for 1 hour and then at 150° C. for 60 minutes to obtain a resin layer sample A3 having a film thickness of 40 μm. According to the foregoing method, it is demonstrated that the obtained resin layer sample contains the reaction product of polyurethane and polyimide.

Example 4

Preparation of Acrylic Resin Prepolymer Solution 3

2-hydroxyethyl methacrylate: 50 parts
n-butyl methacrylate: 50 parts
Azobisisobutyronitrile (AIBN, polymerization initiator): 2 parts
Butyl acetate: 100 parts The foregoing components are placed in a dropping funnel and added dropwise with stirring over 3 hours to 100 parts of butyl acetate which is warmed to a temperature of 110° C. under nitrogen reflux, followed by polymerization. In addition, a liquid including 50 parts of butyl acetate and 2 parts of AIBN is added dropwise thereto over 1 hour, followed by further stirring for 1 hour to complete the reaction. During the reaction, the temperature is maintained at 110° C. and stirring is continued. The reaction liquid is concentrated to a 40% concentration to synthesize an acrylic resin prepolymer solution 3 where an acrylic resin prepolymer is dissolved in a solvent.

<Formation of Resin Layer Sample A4>

Acrylic resin prepolymer solution 3: 100 parts

Polyimide solution (trade name: UNIDIC V-8000, concentration: 40%, manufactured by DIC Corporation): 30 parts Isocyanate solution 1 (trade name: DURANATE TPA-100, effective NCO %: 23%, manufactured by Asahi Kasei Chemicals Corporation): 27 parts Among the foregoing components, first, the acrylic resin prepolymer solution and the polyimide solution are mixed, and the isocyanate solution 1 is added thereto, followed by defoaming for 10 minutes under reduced pressure. The resulting residue is cast into a polyimide film having a thickness of 90 μm, and cured at 80° C. for 1 hour and then at 130° C. for 60 minutes to obtain a resin layer sample A4 having a film thickness of 40 μm. According to the foregoing method, it is demonstrated that the obtained resin layer sample contains the reaction product of polyurethane and polyimide.

Example 5

Formation of Resin Layer Sample A5

Acrylic resin prepolymer solution 2: 100 parts

Polyimide solution 1 (trade name: UNIDIC V-8000, concentration: 40%, manufactured by DIC Corporation): 10 parts Isocyanate solution 1 (trade name: DURANATE TPA-B80E, effective NCO %: 12.5%, manufactured by Asahi Kasei Chemicals Corporation): 10 parts A resin layer sample A5 having a film thickness of 40 μm is obtained in the same manner as in Example 1, except that the foregoing components are used. According to the foregoing method, it is demonstrated that the obtained resin layer sample contains the reaction product of polyurethane and polyimide.

Example 6

Formation of Resin Layer Sample A6

Acrylic resin prepolymer solution 2: 100 parts

Polyimide solution 1 (trade name: UNIDIC V-8000, concentration: 40%, manufactured by DIC Corporation): 50 parts Isocyanate solution 1 (trade name: DURANATE TPA-B80E, effective NCO %: 12.5%, manufactured by Asahi Kasei Chemicals Corporation): 50 parts A resin layer sample A6 having a film thickness of 40 μm is obtained in the same manner as in Example 1, except that the foregoing components are used. According to the foregoing method, it is demonstrated that the obtained resin layer sample contains the reaction product of polyurethane and polyimide.

Comparative Example 1

Formation of Resin Layer Sample B1

Acrylic resin prepolymer solution 1: 100 parts

Isocyanate solution 1 (trade name: DURANATE TPA-B80E, effective NCO %: 12.5%, manufactured by Asahi Kasei Chemicals Corporation): 62 parts The foregoing components are mixed, followed by defoaming for 10 minutes under reduced pressure. The resulting residue is cast into a polyimide film having a thickness of 90 μm, and cured at 80° C. for 1 hour and then at 150° C. for 60 minutes to obtain a resin layer sample B1 having a film thickness of 40 μm.

Comparative Example 2

Formation of Resin Layer Sample B2

Acrylic resin prepolymer solution 3: 100 parts

Isocyanate solution 1 (trade name: DURANATE TPA-100, effective NCO %: 23%, manufactured by Asahi Kasei Chemicals Corporation): 27 parts The foregoing components are mixed, followed by defoaming for 10 minutes under reduced pressure. The resulting residue is cast into a polyimide film having a thickness of 90 μm, and cured at 80° C. for 1 hour and then at 130° C. for 60 minutes to obtain a resin layer sample B2 having a film thickness of 40 μm.

EVALUATION

Measurement of Return Ratio

For the resin layer samples obtained in the foregoing Examples and Comparative Examples, the initial return ratio is measured. The measurement of the return ratio is carried out at a temperature of 160° C.

In addition, the obtained resin layer samples are heated at a temperature of 200° C. for 200 hours, followed by the same measurement to determine the post-heating return ratio. The results are given in Table 1.

With regard to measurement of the return ratio, using a FISCHERSCOPE HM2000 (manufactured by Fischer Co., Ltd.) as a measuring apparatus, a sample resin layer is adhesively fixed to a slide glass which is then set on the measuring apparatus. A load is gradually applied, increasing up to 0.5 mN, to the sample resin layer at the aforementioned measurement temperatures over 15 seconds and maintained at 0.5 mN for 5 seconds. Maximum displacement at that time is taken as (h1). Then, a load is gradually released, decreasing to 0.005 mN over seconds and maintained at 0.005 mN for 1 minute. Displacement at that time is taken as (h2). Based on these values, the return ratio [(h1−h2)/h1]×100(%) is calculated.

Test for Damage Restoration Rate

According to the following method, the damage restoration rate is evaluated for the initial resin layer samples and the resin layer samples after being heated at a temperature of 200° C. for 200 hours.

Specifically, polyimide films having resin layer samples formed thereon are placed on hot plates and damaged with a tip of a metal pincette. Then, a period of time taken for restoration from damage is measured. The evaluation is carried out at 100° C. and 160° C. The evaluation criteria are as follows. The results are given in Table 1.

G1: No restoration from damage occurs

G2: Restoration from damage takes 1 hour or more

G3: Restoration from damage occurs within 30 minutes

G4: Restoration from damage occurs within 1 minute

Measurement of Contact Angle

Among the resin layer samples obtained in the foregoing Examples and Comparative Examples, the initial contact angle is measured for the resin layer samples containing fluorine atoms. The measurement of the contact angle is carried out at a temperature of 20° C.

In addition, the obtained resin layer samples are heated at a temperature of 200° C. for 200 hours, followed by the same measurement to determine the post-heating contact angle. The results are given in Table 2.

The measurement of the contact angle is carried out using a contact angle meter (Model No. CA-S-Roll type, manufactured by Kyowa Interface Science Co., Ltd.).

Releasability Test

According to the following method, the releasability is evaluated for the initial resin layer samples and the resin layer samples after being heated at a temperature of 200° C. for 200 hours.

Specifically, polyimide films having resin layer samples formed thereon are placed on the fixing roll surface of a fixing unit, and a black unfixed solid image is allowed to pass therethrough to confirm fixability. The fixing unit used is a DocuCentre C2101 (trade name, manufactured by Fuji Xerox Co., Ltd.). The evaluation criteria are as follows. The results are given in Table 2.

G1: Attachment of toner to entire surface of resin layer samples

G2: Attachment of toner to half of resin layer samples

G3: Attachment of toner to 30% of resin layer samples

G4: No attachment of toner to resin layer samples

TABLE 1

| | Return ratio (%) | | Initial damage restoration rate | | Post-heating damage restoration rate | |
|---|---|---|---|---|---|---|
| | Initial | Post-heating | 100° C. | 160° C. | 100° C. | 160° C. |
| Example 1 | 96 | 89 | G3 | G4 | G3 | G4 |
| Example 2 | 95 | 88 | G3 | G4 | G3 | G4 |
| Example 3 | 94 | 90 | G3 | G4 | G3 | G4 |
| Example 4 | 97 | 85 | G3 | G4 | G3 | G4 |
| Example 5 | 93 | 86 | G3 | G4 | G3 | G4 |
| Example 6 | 92 | 89 | G3 | G4 | G3 | G4 |
| Comparative Example 1 | 97 | 62 | G3 | G4 | G1 | G1 |
| Comparative Example 2 | 97 | 68 | G3 | G4 | G1 | G1 |

TABLE 2

| | Contact angle (°) | | Releasability | |
|---|---|---|---|---|
| | Initial | Post-heating | Initial | Post-heating |
| Example 1 | 98 | 88 | G4 | G3 |
| Example 2 | 98 | 87 | G4 | G3 |
| Example 3 | 100 | 99 | G4 | G4 |
| Example 5 | 100 | 98 | G4 | G4 |
| Example 6 | 101 | 99 | G4 | G4 |
| Comparative Example 1 | 97 | 76 | G4 | G1 |

From the results of Table 1, it can be seen that surface damage-restoring properties are not readily susceptible to changes by heat in Examples, as compared to Comparative Examples.

From the results of Table 2, it can be seen that releasability of the surface is less susceptible to changes by heat in Examples, as compared to Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin material comprising a reaction product by reacting an isocyanate with an acrylic resin containing a side chain having a hydroxyl group in the presence of a polyimide.

2. The resin material according to claim 1, wherein the acrylic resin contains a side chain having a fluorine atom.

3. The resin material according to claim 2, wherein the polyimide is a solvent-soluble polyimide.

4. The resin material according to claim 1, wherein the polyimide is a solvent-soluble polyimide.

5. The resin material according to claim 1, wherein the content of the polyimide is in the range of from 0.1 part by mass to 100 parts by mass, based on 100 parts by mass of the acrylic resin.

6. The resin material according to claim 1, further comprising a polyol having a plurality of hydroxyl groups upon reaction.

7. The resin material according to claim 6, wherein the content of the isocyanate is such that the number of moles of isocyanate group is in the range of from 0.5 time to 3 times as much as the total number of moles of hydroxyl groups of the acrylic resin and moles of hydroxyl groups of the additive.

8. An endless belt comprising the resin material of claim 1 on a belt-like substrate.

9. The endless belt according to claim 8, wherein the acrylic resin contains a side chain having a fluorine atom.

10. An image fixing unit, comprising:
a first rotating body; and
a second rotating body being in contact with the first rotating body to form a nip region for inserting a recording medium,
wherein at least one of the first rotating body and the second rotating body is the endless belt of claim 8.

11. An image forming apparatus, comprising:
an electrostatic latent image holding member;
an electrostatic latent image forming unit for forming an electrostatic latent image on the surface of the electrostatic latent image holding member;
a developing unit for developing the electrostatic latent image by toner to form a toner image;
a transfer unit for transferring the toner image to a recording medium; and
the image fixing unit of claim 10 for fixing the toner image on the recording medium.

12. A roll comprising the resin material of claim 1 on a cylindrical substrate.

13. The roll according to claim 12, wherein the acrylic resin contains a side chain having a fluorine atom.

14. An image fixing unit, comprising:
a first rotating body; and
a second rotating body being in contact with the first rotating body to form a nip region for inserting a recording medium,
wherein at least one of the first rotating body and the second rotating body is the roll of claim 12.

15. An image forming apparatus, comprising:
an electrostatic latent image holding member;
an electrostatic latent image forming unit for forming an electrostatic latent image on the surface of the electrostatic latent image holding member;
a developing unit for developing the electrostatic latent image by toner to form a toner image;
a transfer unit for transferring the toner image to a recording medium; and
the image fixing unit of claim 14 for fixing the toner image on the recording medium.

* * * * *